(12) United States Patent
Gueorguiev

(10) Patent No.: US 8,854,308 B2
(45) Date of Patent: Oct. 7, 2014

(54) ILLUMINATING COLORED KEYBOARD BACKLIGHTS BASED ON DISPLAY PORTIONS

(75) Inventor: George Hristov Gueorguiev, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 13/561,736

(22) Filed: Jul. 30, 2012

(65) Prior Publication Data

US 2014/0028565 A1    Jan. 30, 2014

(51) Int. Cl.
*G06F 3/02*    (2006.01)

(52) U.S. Cl.
USPC ............................................. 345/168

(58) Field of Classification Search
CPC ........................................................ G06F 3/02
USPC ............................... 345/168, 169, 170, 214
See application file for complete search history.

(56) References Cited

U.S. PATENT DOCUMENTS

| | | |
|---|---|---|
| 2009/0201253 A1 | 8/2009 | Jason et al. |
| 2010/0090959 A1* | 4/2010 | Zaremba ....................... 345/169 |
| 2010/0225640 A1* | 9/2010 | Vieri et al. .................... 345/214 |
| 2010/0300856 A1 | 12/2010 | Pance et al. |
| 2010/0302169 A1 | 12/2010 | Pance et al. |
| 2012/0206369 A1* | 8/2012 | Chou et al. .................... 345/170 |

* cited by examiner

*Primary Examiner* — Fred Tzeng
(74) *Attorney, Agent, or Firm* — Milin N. Patel

(57) ABSTRACT

Example embodiments disclosed herein relate to illuminating backlights based on dominant colors presented on a display. Dominant colors of portions of the display are determined. Backlights of a keyboard are caused to be illuminated to colors based on respective dominant colors.

15 Claims, 4 Drawing Sheets

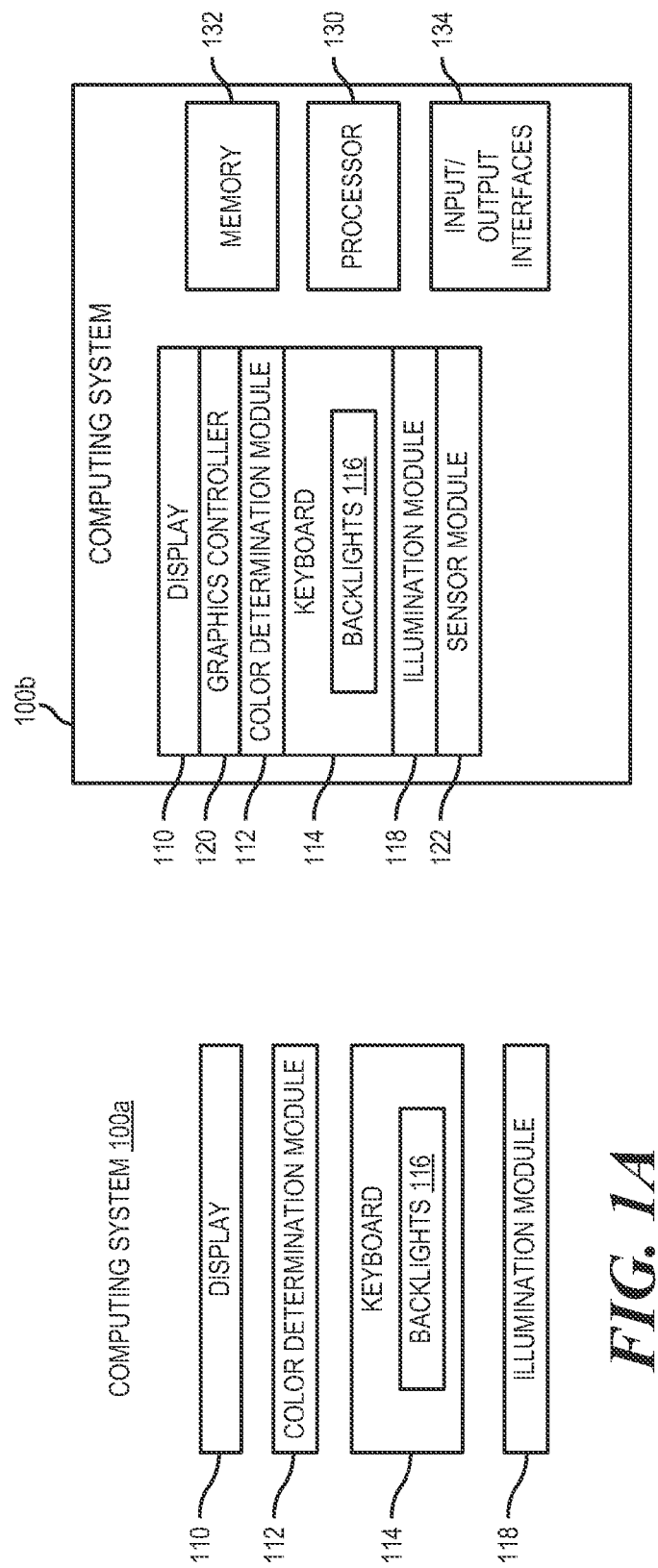

ILLUMINATING COLORED KEYBOARD BACKLIGHTS BASED ON DISPLAY PORTIONS

BACKGROUND

Service providers and manufacturers are challenged to deliver quality and value to consumers, for example by providing backlit keyboards. Portable computing systems are often used in low light environments. It can be difficult for a user to see the keys of the keyboard while in such an environment. Backlit keyboards can illuminate the keys to provide light.

SUMMARY

Example embodiments disclosed herein relate to illuminating backlights based on dominant colors presented on a display. In one example, a computing system includes a display to present images. The computing system can include a color determination module to determine a first color that is dominant at a first portion of the display and a second color that is dominant at a second portion of the display. Further, the computing system can include a keyboard including a first backlight associated with a first section of the keyboard and a second backlight associated with a second section of the keyboard. Moreover, the computing system can include an illumination module to cause colored illumination of the first backlight based on a function of the first color and to cause colored illumination of the second backlight based on a function of the second color.

In another example, a method can include presenting images on a display of a computing system. The display can include multiple portions. The method can include determining, at a color determination module, dominant colors each respectively associated with one of a plurality of portions of the display. The method can further include controlling illumination of colored backlit zones of a keyboard of the computing system to respective colors. Each of the colored backlit zones can be based on a function of the corresponding dominant colors.

In yet another example, a computing device can control images on a display. The computing device can determine dominant colors each respectively associated with one of portions of the display. Further, the computing device can cause illumination of backlit zones of a keyboard of the device to respective colors. Each of the colored backlit zones corresponds to one of the dominant colors.

BRIEF DESCRIPTION OF THE DRAWINGS

The following detailed description references the drawings, wherein:

FIGS. 1A and 1B are block diagrams of computing systems including a keyboard with backlights that are controlled to illuminate based on colors presented at a display, according to various examples;

DETAILED DESCRIPTION

Figure 2A:
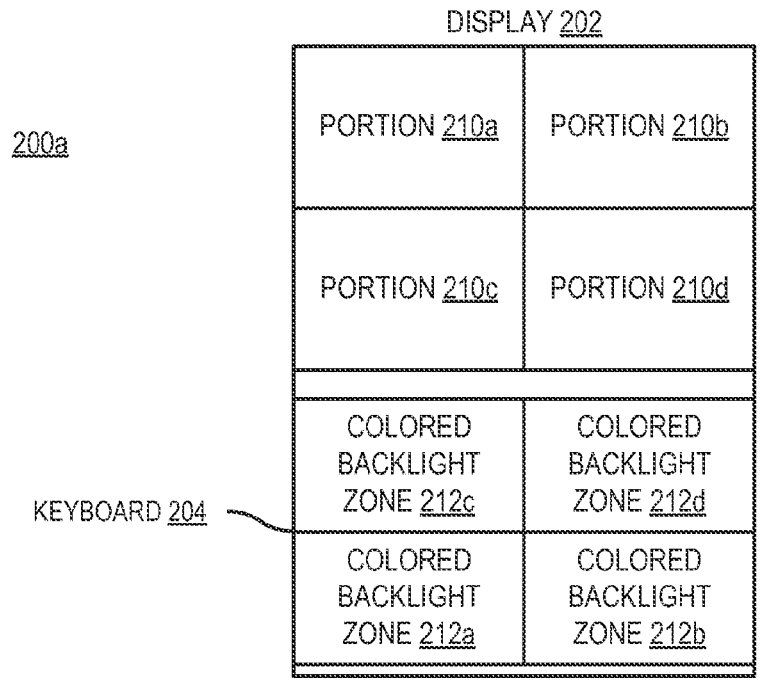
FIGS. 2A and 2B are block diagrams showing the illumination of a keyboard based on colors associated with portions of a display, according to various examples.

Manufacturers of computing devices such as desktop computers, workstations, laptop computers, netbook computers, mobile computing devices, etc. are challenged to provide improvements to usability of the computing devices. Further, manufacturers may wish to engage users and/or distinguish their products from other manufacturers.

Many desktop devices as well as mobile devices now include an illuminated or backlit keyboard. To distinguish a product from a manufacturer, the manufacturer can change approaches to how the keyboard is illuminated. This can be used to enhance user experience as well as distinguish the manufacturer's device from other competitors.

Accordingly, various embodiments disclosed herein relate to enhancing user experience by adapting backlights of a keyboard to change color based on what is being displayed on an associated display. In one example, the keyboard can be divided into zones. Each of the zones can be associated with a different portion of the display. The color of the respective zones can be based its associated portion. For example, the color of a zone can be based on a function of the associated portion.

In one example, an analysis can be performed on the portion of the display to determine a dominant color. The dominant color can then be used to determine the color of the zone. For example, the backlit color of the zone can match the dominant color or be altered by the function to be similar to the dominant color. In another example, the backlit color of the zone can contrast the dominant color or be altered by a function to be a contrasting color compared to the dominant color. Moreover, the zones can each be based on respective dominant colors from different portions of the display. In one example, the color with the largest proportional area of the portion is the dominant color. In another example, the dominant color is based on a function of the colors and/or colored areas of a portion. Processing can be performed on the areas, pixels, and/or colors to average colors to determine the dormant color.

The display can be divided into multiple portions. For example, the display can have a few portions or many portions. In one example, the display can have as many portions as zones of a keyboard. In another example, each of the zones corresponds to a key of the keyboard. In other examples, a portion can be associated with multiple zones, multiple portions can be associated with a zone, or a combination thereof. Moreover, areas on the edges of zones and/or in between zones can also have associated backlights. These backlights can be lit to a color that helps blend the color between zones.

With this approach, backlights of the keyboard can be tuned to the colors presented on the display. For example, the keyboard's colors can match on-screen colors or contrast from on-screen colors. This type of tuning can improve user interaction.

Further, in some examples, the changes to the colors can be made in real-time, be based on a timer (for example, the keyboard backlights can update on a regular timed interval), or be based on an analysis of the colors provided on the display. For example, an analysis of the colors can be used to determine a dominant color on at a time and/or in a continuous fashion. When the dominant color changes by a threshold amount, the keyboard backlights can be updated.

FIGS. 1A and 1B are block diagrams of computing systems including a keyboard with backlights that are controlled to illuminate based on colors presented at a display, according to various examples. Computing systems 100a, 100b include components that can be utilized to illuminate keyboard backlights based on colors presented at the display. The respective computing systems 100a, 100b may be a notebook computer, a desktop computer, a server, a workstation, or any other computing system that can use a display and keyboard. In one example, computing system 100a includes a display 110, a color determination module 112, a keyboard 114 with associated backlights 116, and an illumination module 118. In another example, computing system 100b can further include a graphics controller 120, a sensor module 122, a processor 130, memory 132, input/output interfaces 134, or a combination thereof.

The computing system 100 can execute programs on the processor 130. During execution of the programs, a graphics controller 120 or other processor can be used to provide images for the display 110 to present. This can be via an interface, such as Digital Visual Interface (DVI), DisplayPort, High-Definition Multimedia Interface (HUM, a Video Graphics Array (VGA), proprietary interfaces, wireless interfaces, etc. The information can be converted and/or presented by the display 110. As such, the display 110 can be caused to present images.

The presented images can have colors associated. The graphics controller 120 and/or sensor module 122 can be used to provide color information about the images presented. In one example, the graphics controller 120 can control the images on the display 110. Further, the graphics controller 120 can provide color information about the images to a color determination module 112. In one example, the color determination module 112 may be associated with a part of the graphics controller 120. The color information can include information about the colors presented on the display and/or to be presented on the display. The color information can include information about colors that are to be presented on various portions of the display 110. In one example, the display can be broken up into multiple portions. The portions can be associated with respective zones of the keyboard and/or individual backlights. The color information can be specific to each portion. Further, in some examples, the color information can be as specific as to a pixel of the display 110 that should be colored at a particular level. In one example, the color information can be represented as a single number for each pixel and/or a group of pixels or other unit. In another example, the color information can be split into another mode, for example, separate Red Green Blue (RGB) values.

Similarly, the sensor module 122 can control a sensor, such as an optical sensor or camera to generate color information. The color information is provided to color determination module 112. Color information from the sensor or a group of sensors can be broken up into portions of the display 110 that are being observed. For example, the color information can include colors and associated coordinates.

The color determination module 112 can be used to determine a first color that is dominant at a first portion of the display and a second color that is dominant at a second portion of the display. Further, the color determination module 112 can determine a third color that is dominant at a third portion of the display, or other colors that are dominant on other portions of the display. As such, dominant colors of multiple portions of the display can be determined. As noted above, the dominant color is based on a function of the colors and/or colored areas of a portion. Processing can be performed on the areas, pixels, and/or colors to average colors to determine the dominant color. In some examples, the color with the largest proportional area of the portion is the dominant color. The function can be user controllable. For example, the user can add/modify parameters and/or variables to determine a dominant color. Moreover, the dominant color can be based on an analysis of a numerical representation associated with the areas or pixels, such as a single value or a set of values (for example, RCB values).

As noted, the computing system 100 can include a keyboard 114 with backlights 116. The keyboard 114 can be physically attached to the display via a base, for example, as in a netbook, laptop, or ultrabook. In such an example, a keyboard base that is pivotally connected to the display can be used to hold the keyboard 114. As such, the keyboard 114 can be disposed on the keyboard base. A keyboard 114 may also be external to the display, for example, connected to other components of the computing system 100 via a peripheral cable such as a Universal Serial Bus (USB) cable, another connector, wirelessly, or the like. Further, backlights can be disposed near each of the keys of the keyboard.

The keyboard backlights 116 can be associated with zones or sections of the keyboard 114. In one example, a zone is a region of the keyboard distinguished from other parts of the keyboard 114. A zone can be distinguished, for example, by an associated backlight color. In another example, a section of the keyboard 114 is a subdivision of the keyboard 114. A subdivision can be based on what backlights are associated with each subdivision. For example, a first backlight or set of backlights can be associated with a first section of the keyboard 114 while a second backlight or set of backlights is associated with a second section of the keyboard 114. The backlights can include, for example, tri-color light emitting diodes (LEDs) to provide backlight to the keyboard 114. Other types of lighting technologies that control an illuminated color can also be used.

The illumination module 118 can be used to cause colored illumination of the first backlight based on a function of a first dominant color determined to be dominant in an associated first portion. Similarly, the illumination module 118 can be used to cause colored illumination of a second backlight based on a function of a second dominant color determined to be dominant in an associated second portion of the display 110. Further, other backlights 116 associated with dominant colors of other portions of the display 110 can be illuminated based on respective dominant colors of respective portions.

When the illumination module 118 illuminates a backlight, the illumination module 118 can provide power, control a signal, write to a memory associated with controlling the backlight, a combination thereof, or the like. In some examples, three control signals can be used to light a tri-color diode used for the backlight. In other examples, backlights 116 can be associated with a bus and controlled by writing to a memory address. A circuit can be used to illuminate the tri-color diode to a determined color based on the information stored at the memory address.

In one example, the first backlight is illuminated to the first dominant color associated with the first portion of the display 110. The second backlight can be illuminated to the second dominant color associated with the second portion of the display 110. In another example, a third backlight associated with another dominant color of a third portion of the display is caused to be illuminated based on a function of the associated dominant color by the illumination module 118. A function or respective functions for respective portions can be used to contrast or match colors of the backlights to the corresponding portions.

As noted above, other backlights can be illuminated corresponding to other portions of the display 110. Further, each of the backlights can be associated with a zone or section that is also associated with the respective portion. The zones or sections can include the backlight and/or additional backlights that can be controlled to produce the determined color light. As such, a section or zone of one backlight or multiple backlights can be used to illuminate a part of the keyboard 114 to a particular color.

In one example, the keyboard 114 can have three sections of backlights and the display can be divided into three portions. A first section, second section, and third section of the keyboard 114 can be lit according to a dominant color on respective first portion, second portion, and third portion of the display 110. The sections can physically correspond to the portions. For example, in the case of a laptop computing system, the sections of the keyboard 114 can match as a mirror image where the bottom of the display and the top of the keyboard match and the left side of the keyboard and the left side of the display match. In another example, the sections of the keyboard 114 can correspond according to another pattern, such as the bottom of the display corresponding to the bottom of the keyboard.

Analysis and/or illumination of the backlights 116 can be changed in real-time, based on triggers, based on timer, a combination thereof, or the like. For example, the color information about what is displayed could be processed continuously. The backlights can be continuously updated based on the color information. In another example, the color information can be processed continuously, but will be updated when the color changes by at least a certain threshold level, such as in a similar manner to hysteresis. For example, if the dominant color is determined based on an RGB value, an analysis of the RGB values can be performed to determine when to update the backlights. In one example, if the R value, G value, B value, or a combination thereof changes by a threshold amount, the update can occur. In a further example, the color information can be processed at an interval and the backlights updated according to the interval. In some examples, the interval can be in the order of microseconds, milliseconds, seconds, or the like.

In some examples, the illumination of zones of the keyboard is associated with the backlighting of keys. In other examples, the illumination can also include the coloring of other sources of light on the keyboard and/or a base associated with the keyboard, such as LEDs or buttons for associating with or for turning on/off a wireless adapter, email, power, num lock, mute, sound, etc.

A processor 130, such as a central processing unit (CPU) or a microprocessor suitable for retrieval and execution of instructions and/or electronic circuits can be configured to perform the functionality of any of the modules 112, 118, 122, or graphics controller 120 described herein. As noted above, the color determination module 112 may be implemented as part of the graphics controller 120. In certain scenarios, instructions and/or other information, such as color information, can be included in memory 132 or other memory. Input/output interfaces 134 may additionally be provided by the computing system 100b. For example, input devices, such as other keyboards, sensors, touch interfaces, a mouse, a microphone, etc. can be utilized to receive input from an environment surrounding the computing system 100b. Further, an output device, such as another display, can be utilized to present information to users. Examples of output devices include speakers, display devices, amplifiers, etc. Moreover, in certain embodiments, some components can be utilized to implement functionality of other components described herein.

Each of the modules 112, 118, 122 and/or the graphics controller 120 may include, for example, hardware devices including electronic circuitry for implementing the functionality described herein. In addition or as an alternative, each module 112, 118, 122, and/or the graphics controller 120 may be implemented as a series of instructions encoded on a machine-readable storage medium of computing system 100 and executable by processor 130 or another processor (for example, a graphics processor). It should be noted that, in some embodiments, some modifies are implemented as hardware devices, while other modules are implemented as executable instructions.

Figure 2B:
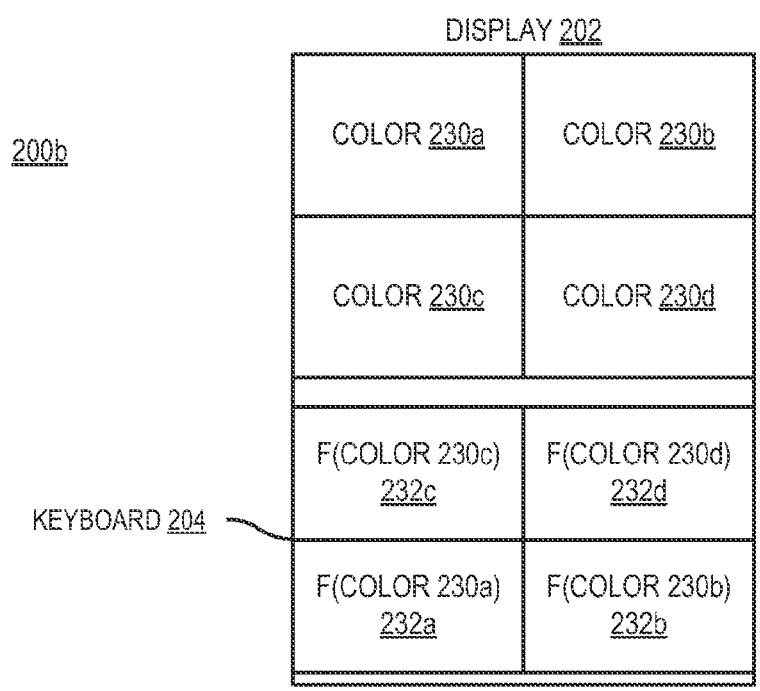

FIGS. 2A and 2B are block diagrams of showing the illumination of a keyboard based on colors associated with portions of a display, according to various examples. FIGS. 2A and 2B show computing systems 200a, 200b that include a display 202 and a keyboard 204. The display 202 is divided into portions 210a, 210b, 210c, 210d. Four portions 210 are displayed in the diagram for illustrative purposes, but it should be recognized that additional portions 210 can be used and the locations, sizes, and shapes of the portions 210 can change.

The keyboard 204 can include colored backlight zones 212a, 212b, 212c, 212d that correspond to the portions 210. As with the portions 210, additional zones can be used and the colored backlight zones 212 can come in various locations sizes, and shapes.

When the computing system 200 is processing and displaying information on the display 202, the colored backlight zones 212 can be active. As such, color information about images presented on the portions can be determined. A dominant color 230a, 230b, 230c, 230d for each of the portions 210 can be determined. As noted above, the dominant colors can be determined based on an analysis of the color information, which can be determined using a sensor or via a processor that can snoop information to be presented on the display.

The light emitted from the colored backlight zones 212 of keyboard 204 can be based on dominant colors of the respective portions 210. As such, the controlled backlight zones 232a, 232b, 232c, 232d can be based on functions of the respective dominant colors 230. As noted above, these backlights can change colors in real-time, based on intervals, based on thresholds, or combinations thereof.

In one example, the display 202 can be of a forest with a lake. Portion 210a can include green vegetation and trees while portion 210c includes brown wood, portion 210b includes green vegetation and a part of a blue lake, and portion 210d includes a blue lake. As such, color 230a can be determined to be a shade of green, color 230b can be another shade of green, color 230c can be a shade of brown, and color 230d can be a shade of blue. Accordingly, the colors of backlights associated with zones 232a-232d can be based on functions of the determined colors 230. In one example, the functions have the backlit zones match. As such, zone 232a can be green, zone 232b can be another shade of green, zone 232c can be a shade of brown, and 232d can be a shade of blue. In other examples, the function can make the colors contrast. Further, in some examples, the relationship between the zones 232 and the portions 210 can be different or vary.

Figure 3:
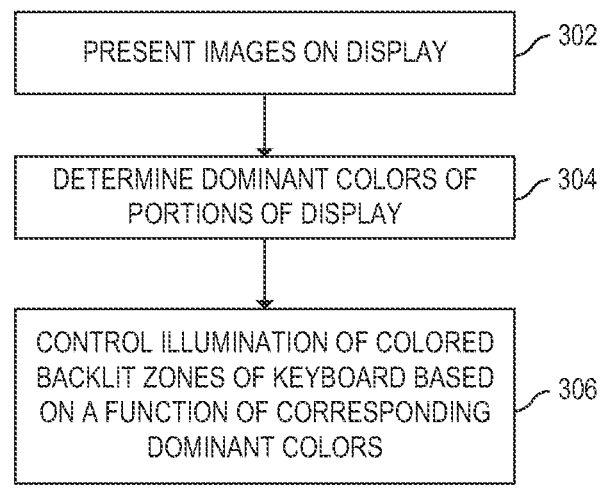
FIG. 3 is a flowchart of a method for controlling illumination of colored backlit zones based on a function of corresponding dominant colors of a display, according to one example.

FIG. 3 is a flowchart of a method for controlling illumination of colored backlit zones based on a function of corresponding dominant colors of a display, according to one example. Method 300 may be implemented in the form of executable instructions stored on a machine-readable storage medium and/or in the form of electronic circuitry.

At 302, a computing system causes presentation of images on a display. The display can include multiple portions. The portions can be divided based on various criteria. In one example, the portions can be divided horizontally or vertically on a screen. In another example, the portions can be split into other shapes. Moreover, some portions can be of differing sizes than other portions. The portions can also be split based on locations of pixels of the display. In one example, color information about portions can be determined from a sensor. In another example, color information can be determined from a graphics processor driving the images.

At 304, the computing system can determine dominant colors that are respectively associated with the portions of the display. In certain examples, each of the portions can be processed to determine respective dominant colors. In other examples, dominant color some of the portions are determined. The dominant colors can be determined based on the color information. As noted, the color information can be received from a graphics processor or controller controlling the images.

Then, at 306, illumination of multiple colored backlit zones of a keyboard of the computing system is controlled to illuminate to the zones to respective colors. Each of the colored backlit zones can be based on a function of the corresponding dominant colors.

For example, a first portion can correspond to a first zone. The dominant color determined for the first portion can be processed via a function to determine what color to illuminate the first zone to. One or more backlights can be controlled to provide the illumination. In one example, the function causes the backlit zone to be a color that corresponds to the color of the display. For example, a determination that a shade of green is dominant can lead to a green backlight for the first zone. In another example, the function causes the backlit zone to be a color that contrasts the color of the display. For example, a determination that a shade of red is dominant can lead to a blue backlight for the first zone. As noted above, multiple different zones can be lit to different colors based on the respective zones.

Figure 4:
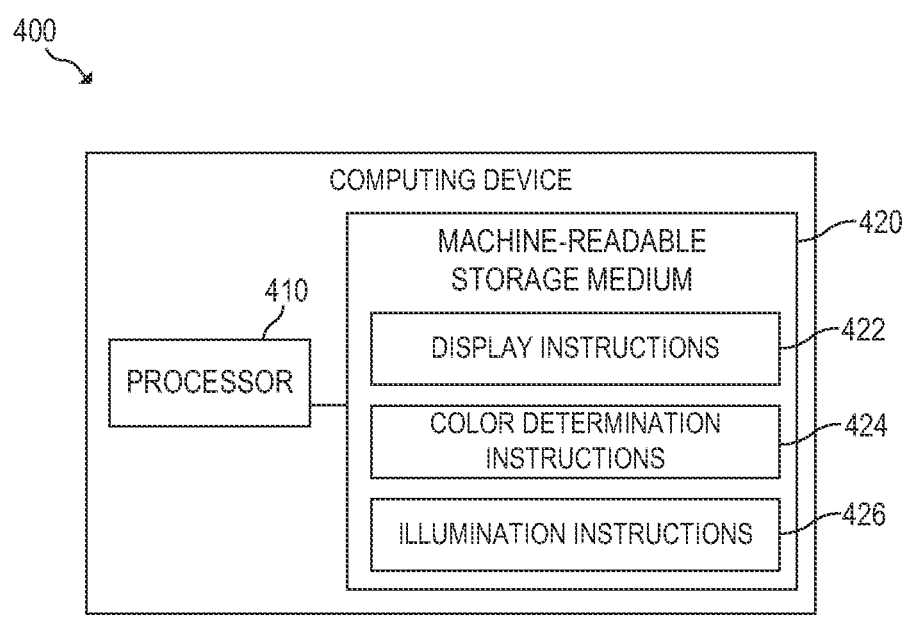
FIG. 4 is a block diagram of a computing device including a keyboard that is backlit based on dominant colors of a display, according to one example.

FIG. 4 is a block diagram of a computing device including a keyboard that is backlit based on dominant colors of a display, according to one example. The computing device 400 includes, for example, a processor 410, and a machine-readable storage medium 420 including instructions 422, 424, 426 for illuminating a keyboard based on dominant colors of portions of an associated display. Computing device 400 may be, for example, a notebook computer, portable reading device, a wireless email device, a mobile phone, a desktop computer or any other computing device that can use a keyboard.

Processor 410 may be, at least one central processing unit (CPU), at least one semiconductor-based microprocessor, at least one graphics processing unit (CPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement method 300 or otherwise control backlighting of a keyboard based on dominant colors presented on a display. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for controlling the illumination of backlights of a keyboard according to colors presented on portions of a display.

Display instructions 422 can be used to control images on a display when executed by at least one processor 410 such as a graphics controller or a CPU. Colors presented on portions of the display can be used to control illumination of backlights of a keyboard.

Color determination instructions 424 can be executed to determine dominant colors each respectively associated with one of multiple portions of the display. In one example, if there are four portions, four dominant colors can be determined. The dominant colors can be determined from color information. In one example, color information about the portions can be determined from optical sensor information collected from one or more sensors about the respective portions. In another example, the color information can be provided by the processor 410 or CPU controlling the display of the images.

Illumination instructions 426 may be executed to cause illumination of backlit zones of the keyboard of the device to respective colors. The respective colors of the colored backlit zones can correspond to the dominant colors of the associated portions as discussed above. The execution of the illumination instructions 426 can cause a signal or a bus to be controlled. The signal or bus can control at least one multi-colored LED for each of the backlit zones to illuminate the respective colored backlit zones. Further, as discussed above, the backlit zones can be lit based on a function of the respective dominant colors. Moreover, the function can cause a contrasting color to the dominant color to be illuminated or a similar color to the dominant color be illuminated.

What is claimed is:

1. A computing system comprising:
a display to present images;
a color determination module to determine a first color that is dominant at a first portion of the display and a second color that is dominant at a second portion of the display;
a keyboard including a first backlight associated with a first section of the keyboard and a second backlight associated with a second section of the keyboard; and
a illumination module to cause colored illumination of the first backlight based on a function of the first color and to cause colored illumination of the second backlight based on a function of the second color.

2. The computing system of claim 1, wherein the first backlight is to be illuminated to the first color and the second backlight is to be illuminated to the second color.

3. The computing system of claim 1, wherein the first backlight and the second backlight respectively include tri-color light emitting diodes.

4. The computing system of claim 1, further comprising:
a third backlight associated with a third section of the keyboard,
wherein the color determination module is to determine a third color that is dominant at a third portion of the display, and
wherein the illumination module is caused to illuminate the third backlight based on the third color.

5. The computing system of claim 4, wherein the computing system is a laptop computer further comprising:

a keyboard base pivotally connected to the display, wherein the keyboard is disposed upon the keyboard base, and wherein the first section, the second section, and the third section respectively physically correspond to the first portion, the second portion, and the third portion.

6. The computing system of claim 1, further comprising:

an optical sensor to sense color information about the first portion and the second portion and wherein the first color and the second color are based on the color information.

7. The computing system of claim 1, further comprising:

a graphics controller to control the images on the display, wherein the graphics controller provides color information about the first portion and the second portion to the color determination module, wherein the first color and the second color are based on the color information.

8. The computing system of claim 1, wherein the illumination of the first backlight contrasts from the first color and the illumination of the second backlight contrasts from the second color.

9. A method comprising:

presenting images on a display of a computing system, wherein the display includes a plurality of portions;

determining, at a color determination module, a plurality of dominant colors each respectively associated with one of a plurality of portions of the display; and controlling, via a controller, illumination of a plurality of colored backlit zones of a keyboard of the computing system to respective colors, wherein each of the colored backlit zones is based on a function of the corresponding dominant colors.

10. The method of claim 9, further comprising:

determining the dominant colors based on color information received from a graphics controller controlling the images.

11. The method of claim 9, wherein each of the colored backlit zones contrast their respective dominant colors.

12. A non-transitory machine-readable storage medium storing instructions that, if executed by at least one processor of a device, cause the device to:

control images on a display;

determine a plurality of dominant colors each respectively associated with one of a plurality of portions of the display; and cause illumination of a plurality of backlit zones of a keyboard of the device to respective colors, wherein each of the colored backlit zones corresponds to one of the dominant colors.

13. The non-transitory machine-readable storage medium of claim 12, further comprising instructions that, if executed by the at least one processor, cause the device to:

control at least one multi-color light emitting diode for each of the backlit zones to illuminate the respective colored backlit zones.

14. The non-transitory machine-readable storage medium of claim 12, further comprising instructions that, if executed by the at least one processor, cause the device to:

receive optical sensor information about the respective portions of the display, wherein the dominant colors are determined based on the respective optical sensor information corresponding to the respective portions.

15. The non-transitory machine-readable storage medium of claim 12, wherein the backlit zones are lit based on a function of the respective dominant colors.

* * * * *